(12) United States Patent
Li

(10) Patent No.: US 11,832,047 B2
(45) Date of Patent: Nov. 28, 2023

(54) HEAD-MOUNTED DEVICE, WEARING DETECTION METHOD AND APPARATUS THEREFOR, AND MEDIUM

(71) Applicant: Goertek Inc., Shandong (CN)

(72) Inventor: Yueting Li, Shandong (CN)

(73) Assignee: GOERTEK INC., Shandong (CN)

( * ) Notice: Subject to any disclaimer, the term of this patent is extended or adjusted under 35 U.S.C. 154(b) by 211 days.

(21) Appl. No.: 17/624,169

(22) PCT Filed: Dec. 31, 2019

(86) PCT No.: PCT/CN2019/130292
§ 371 (c)(1),
(2) Date: Dec. 30, 2021

(87) PCT Pub. No.: WO2021/103266
PCT Pub. Date: Jun. 3, 2021

(65) Prior Publication Data
US 2022/0353601 A1    Nov. 3, 2022

(30) Foreign Application Priority Data
Nov. 29, 2019 (CN) .......................... 201911204647.5

(51) Int. Cl.
*H04R 1/10* (2006.01)
*G01S 17/04* (2020.01)
(Continued)

(52) U.S. Cl.
CPC ............. *H04R 1/1041* (2013.01); *G01D 5/16* (2013.01); *G01P 15/18* (2013.01); *G01S 17/04* (2020.01);
(Continued)

(58) Field of Classification Search
CPC .. H04R 1/1041; H04R 1/1016; H04R 1/1058; H04R 5/033; H04R 2420/07; G01S 17/04; G01D 5/16; G01P 15/18
(Continued)

(56) References Cited

U.S. PATENT DOCUMENTS

| 9,946,326 B2 | 4/2018 | Nishiyama et al. |
| 2016/0278647 A1 | 9/2016 | Vogel et al. |

(Continued)

FOREIGN PATENT DOCUMENTS

| CN | 104699239 | 6/2015 |
| CN | 105758452 | 7/2016 |

(Continued)

OTHER PUBLICATIONS

International Search Report issued in PCT/CN2019/130292 dated Aug. 26, 2020.

*Primary Examiner* — Paul Kim
(74) *Attorney, Agent, or Firm* — HAUPTMAN HAM, LLP

(57) ABSTRACT

A head-mounted device, a wearing detection method, a wearing detection apparatus, and a medium are provided. The head-mounted device includes a GMR magnetic sensor and an IR sensor. The GMR magnetic sensor outputs a collected signal so that the MCU calculates a reference parameter indicating a position of the head-mounted device. The IR sensor outputs a collected signal so that the MCU makes determination based on the output signal. Only in a case that the reference parameter and the output signal meet the predetermined condition, it is determined that the head-mounted device is worn.

8 Claims, 5 Drawing Sheets

(51) Int. Cl.
  *G01D 5/16* (2006.01)
  *G01P 15/18* (2013.01)
  *H04R 5/033* (2006.01)

(52) U.S. Cl.
  CPC ......... *H04R 1/1016* (2013.01); *H04R 1/1058* (2013.01); *H04R 5/033* (2013.01); *H04R 2420/07* (2013.01)

(58) Field of Classification Search
  USPC ........................................................ 381/309
  See application file for complete search history.

(56) References Cited

U.S. PATENT DOCUMENTS

| | | |
|---|---|---|
| 2017/0195772 A1 | 7/2017 | Han et al. |
| 2018/0132031 A1 | 5/2018 | Seo et al. |
| 2019/0015045 A1* | 1/2019 | Li .......................... G04C 3/002 |
| 2019/0215611 A1 | 7/2019 | Lou et al. |

FOREIGN PATENT DOCUMENTS

| | | |
|---|---|---|
| CN | 105848029 | 8/2016 |
| CN | 106291121 | 1/2017 |
| CN | 106355828 | 1/2017 |
| CN | 107577410 | 1/2018 |
| CN | 108076405 | 5/2018 |
| CN | 108712697 | 10/2018 |
| CN | 108966087 | 12/2018 |
| CN | 109168102 | 1/2019 |
| CN | 110150781 | 8/2019 |
| CN | 110213685 | 9/2019 |
| TW | 201642805 | 12/2016 |

* cited by examiner

HEAD-MOUNTED DEVICE, WEARING DETECTION METHOD AND APPARATUS THEREFOR, AND MEDIUM

The present application is a 371 Application of International Patent Application No. PCT/CN2019/130292, titled "HEAD-MOUNTED DEVICE, WEARING DETECTION METHOD AND APPARATUS THEREFOR, AND MEDIUM", filed on Dec. 31, 2019, which claims the benefit of and priority to Chinese Patent Application No. 201911204647.5, titled "HEAD-MOUNTED DEVICE, WEARING DETECTION METHOD AND APPARATUS THEREFOR, AND MEDIUM", filed on Nov. 29, 2019 with the Chinese Patent Office, both of which are incorporated herein by reference in their entireties.

FIELD

The present disclosure relates to the field of head-mounted device, and in particular to a head-mounted device, a wearing detection method, a wearing detection apparatus, and a medium.

BACKGROUND

As a commonly used headset, true wireless stereo (TWS) headset can transmit audio signals without wiring. When a user connects a master earphone with a mobile phone, an audio signal is transmitted by the master earphone to a slave earphone. In this way, the user enjoys true wireless services without the trouble caused by a wired headset. The TWS headset may be used in various forms. For example, the TWS headset may be used by one user or shared by multiple users.

Devices in the TWS headset are powered by a battery. Considering overall miniaturization, the battery is small, so that the power supply is limited. Therefore, in order to achieve low power consumption, in the conventional technology, the devices are started only when the headset is determined as being worn. Otherwise, the devices are turned off or dormant. At present, an infrared (IR) sensor, an acceleration sensor or a combination thereof is usually used to detect whether the user wears the headset.

For the TWS headset, in a wearing detection method using an IR sensor, a small hole is provided in a master earphone rod to transmit a light emitted by a transmitter. If the hole is covered, a receiver can receive a reflected light. Whether the headset is worn is determined based on whether the receiver receives a light. The acceleration sensor is a sensor capable of measuring acceleration. Depending on sensitive elements of sensors, commonly-used acceleration sensors include capacitive sensors, inductive sensors, strain sensors, piezoresistive sensors, piezoelectric sensors and the like. In the wearing detection method using an acceleration sensor, whether the headset is worn is determined based on an acceleration value acquired according to the Newton's second law and an inertia force on a mass block measured by the acceleration sensor.

In the conventional technology, the IR sensor is arranged only on a master earphone rod. When the user sometimes plays with the headset in hands, the hole may be covered as when the headset is worn on the ear, resulting in misjudgment. The method of measuring acceleration by an acceleration sensor may also result in misjudgment due to lack of sensitivity or stability.

SUMMARY

A wearing detection method applied to a head-mounted device is provided according to the present disclosure to improve accuracy of detection and improve user experiences.

In order to solve the above technical problems, a wearing detection method applied to a head-mounted device is provided according to the present disclosure. The head-mounted device includes a GMR magnetic sensor and an IR sensor. The method includes: acquiring a signal collected by the GMR magnetic sensor to calculate a reference parameter indicating a position of the head-mounted device, and acquiring an output signal of the IR sensor; determining whether the reference parameter and the output signal meet a predetermined condition; and determining that the head-mounted device is worn if the reference parameter and the output signal meet the predetermined condition.

Preferably, the acquiring a signal collected by the GMR magnetic sensor to calculate a reference parameter indicating a position of the head-mounted device includes: acquiring three-axis data of the GMR magnetic sensor; and calculating acceleration as the reference parameter based on the three-axis data.

Preferably, the determining whether the reference parameter and the output signal meet a predetermined condition includes: determining whether acceleration at a current acquisition time instant is different from acceleration at a previous acquisition time instant; determining whether the output signal is in a predetermined range if the acceleration at the current acquisition time instant is not different from the acceleration at the previous acquisition time instant; and determining that the reference parameter and the output signal meet the predetermined condition if the output signal is in the predetermined range.

Preferably, the output signal of the IR sensor is acquired after the IR sensor is turned on in the case that the acceleration at the current acquisition time instant is not different from the acceleration at the previous acquisition time instant.

Preferably, the head-mounted device is a wireless Bluetooth headset, and the IR sensor includes two IR sensors respectively arranged on an earphone head and an earphone rod of the wireless Bluetooth headset.

Further, the wireless Bluetooth headset is a TWS headset, and the two IR sensors are respectively arranged on an earphone head of a master earphone of the TWS headset and an earphone rod of the master earphone.

Preferably, the determining whether the output signal is in a predetermined range includes: determining whether a condition that the output signal of each of the two IR sensors is in the predetermined range for consecutive n times is met; determining that the output signal is in the predetermined range if the condition is met; and determining that the output signals is not in the predetermined range if the condition is not met, where n is a positive integer greater than 1.

The head-mounted device includes a GMR magnetic sensor and an IR sensor. The apparatus includes an acquisition module, a judgment module and a determination module. The acquisition module is configured to acquire a signal collected by the GMR magnetic sensor to calculate a reference parameter indicating a position of the head-mounted device, and acquire an output signal of an IR sensor. The judgment module is configured to determine whether the reference parameter and the output signal meet a predetermined condition. The determination module is configured to determine that the head-mounted device is worn if the reference parameter and the output signal meet the predetermined condition.

In order to solve the above technical problem, a wearing detection apparatus applied to a head-mounted device is provided according to the present disclosure. The apparatus includes a memory and a processor. The memory stores a computer program. The processor is configured to execute the computer program to perform the wearing detection method applied to a head-mounted device described above.

In order to solve the above technical problem, a computer readable storage medium is provided according to the present disclosure. The computer readable storage medium stores a computer program that, when being executed by a processor, performs the wearing detection method applied to a head-mounted device described above.

In order to solve the above technical problem, a head-mounted device is provided according to the present disclosure. The head-mounted device is a wireless Bluetooth headset comprising a headset body, a GMR magnetic sensor and an IR sensor. The GMR magnetic sensor and the IR sensor are connected to an MCU in the headset body. The MCU is configured to: acquire a signal collected by the GMR magnetic sensor to calculate a reference parameter indicating a position of the wireless Bluetooth headset; acquire an output signal of the IR sensor; determine whether the reference parameter and the output signal meet a predetermined condition; and determine that the wireless Bluetooth headset is worn if the reference parameter and the output signal meet the predetermined condition.

The head-mounted device according to the present disclosure is a wireless Bluetooth headset. The headset includes a GMR magnetic sensor and an IR sensor. The GMR magnetic sensor outputs a collected signal so that the MCU calculates a reference parameter indicating a position of the wireless Bluetooth headset. The IR sensor outputs a collected signal so that the MCU makes determination based on the output signal. Only in a case that the reference parameter and the output signal meet the predetermined condition, it is determined that the wireless Bluetooth headset is worn. It can be seen that with the technical solutions, on one hand, the GMR magnetic sensor is added, which has high detection accuracy and is unsusceptible to external interferences. On the other hand, the GMR magnetic sensor and IR sensor are combined, which improves accuracy of detection, thereby improving user experiences.

In addition, the wearing detection method, apparatus and the medium applied to the head-mounted device according to the present disclosure correspond to the head-mounted device described above, and have the effects the same as those described above.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below are merely a part of drawings of the present disclosure, and those skilled in the art may obtain other drawings according to the provided drawings without any creative effort.

DETAILED DESCRIPTION OF EMBODIMENTS

Technical solutions of embodiments of the present disclosure are described below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

The core of the present disclosure is to provide a head-mounted device, a wearing detection method, a wearing detection apparatus and a medium. It should be noted that the head-mounted device mentioned in the present disclosure may be a TWS headset, a single wireless Bluetooth earphone, a neck-worn Bluetooth headset, a head-worn Bluetooth headset, augmented reality (AR) glasses and the like. In addition to a main body (for example, an MCU for data processing), the head-mounted device further includes a giant magnetoresistance (GMR) magnetic sensor and an IR sensor.

In order to well understand the technical solutions of the present disclosure by those skilled in the art, the technical solutions are explained in detail below in combination with the drawings and embodiments.

Figure 1:
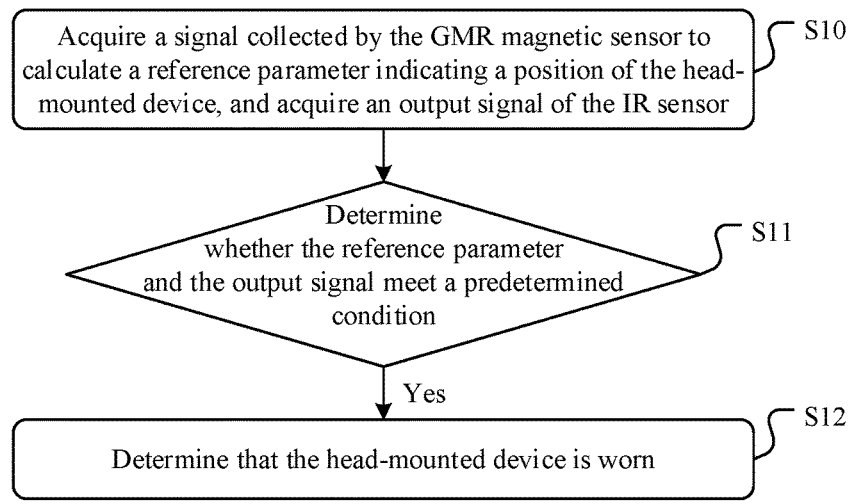
FIG. 1 is a flowchart of a wearing detection method applied to a head-mounted device according to an embodiment of the present disclosure.

FIG. 1 is a flowchart of a wearing detection method applied to a head-mounted device according to an embodiment of the present disclosure. The method includes the following steps S10 to S12.

In step S10, a signal collected by a GMR magnetic sensor is acquired to calculate a reference parameter indicating a position of the head-mounted device, and an output signal of an IR sensor is acquired.

The GMR magnetic sensor is a high-tech product which integrates a magnetic film, semiconductor integration and nanotechnology. Giant magnetoresistance effect is resulted from a resistance change caused by different spin states of current-carrying electrons under action of a magnetic field. In the giant magnetoresistance sensor, four giant magnetoresistors form a Wheatstone bridge structure, which reduces influence of external environment on output stability of the sensor and increases sensitivity of the sensor. At present, the giant magnetoresistance sensor is commonly used to improve storage capacity of a hard disk of a computer, a mobile phone, a portable music player, a camera and the like. In the present disclosure, the giant magnetoresistance sensor is applied to the head-mounted device to take advantage of stability of the giant magnetoresistance sensor. When the giant magnetoresistance sensor operates, a current input terminal is supplied with a steady voltage ranging from 5v to 20v, and an output terminal outputs a voltage signal under action of an external magnetic field.

After the user wears the head-mounted device, a relative position of the GMR magnetic sensor is fixed, so that three-axis data of the GMR magnetic sensor remains unchanged. Then the MCU obtains a reference parameter indicating the position of the head-mounted device. The reference parameter may be expressed in any form. For example, in a case that the position of the head-mounted device is determined based on acceleration, the acceleration is the reference parameter. It should be noted that acceleration is only an example of the reference parameter, but the reference parameter is not limited thereto. Instead of the acceleration, the reference parameter may be expressed by a displacement or the like, which is not limited in the embodiment.

A transmitter of the IR sensor emits an infrared light via a small hole. If the hole is not covered, a receiver cannot receive a reflected light. If the hole is covered, the receiver can receive a reflected light. The output signal of the IR sensor may be a voltage signal or a digital signal corresponding to the voltage signal. For example, in a case that the IR sensor is connected with the MCU, an analog signal is converted into a digital signal to be processed by the MCU.

It should be noted that in the embodiment, time instants for starting the GMR magnetic sensor and the IR sensor are not limited. The GMR magnetic sensor and the IR sensor may be turned on simultaneously after the head-mounted device is turned on. Alternatively, the GMR magnetic sensor and the IR sensor may be turned on after a trigger event. Alternatively, the GMR magnetic sensor may be turned on first and then the IR sensor is turned on when a condition is met, to save power consumption. In addition, before the IR sensor is turned on, a sampling frequency may be set for the IR sensor.

It can be understood that different head-mounted devices have different structures, so that positions of the GMR magnetic sensor and the IR sensor may be configured differently, which depends on an actual structure of the head-mounted device, and is not limited in the present disclosure.

In step S11, it is determined whether the reference parameter and the output signal meet a predetermined condition. Step S12 is performed if the reference parameter and the output signal meet the predetermined condition.

It can be understood that the predetermined condition in the embodiment includes a condition for the reference parameter and a condition for the output signal. It is determined that the reference parameter and the output signal meet the predetermined condition only when both the condition for the reference parameter and the condition for the output signal are met, so as to effectively solve the problem of low accuracy caused by performing wearing detection using only a IR sensor. In an application scenario, when the user plays with the head-mounted device in hands and the small hole in the device body is covered, meeting the condition that the output signal of the IR sensor is blocked. However, the head-mounted device is not fixed, so that the reference parameter indicating the position is not fixed, which does not meet the condition that the device is fixed. Therefore, It is determined that the reference parameter and the output signal do not meet the predetermined condition, so that it is determined that the head-mounted device is not worn.

It can be understood that the predetermined condition is determined according to actual conditions, which may include changes of the reference parameter and the output signal over a period of time, or conditions for values corresponding to the reference parameter and the output signal.

In step S12, it is determined that the head-mounted device is worn.

In embodiments, after the MCU determines that the user wears the headset, a device may be controlled, based on preset control logic, to perform a function. For example, in a case that the head-mounted device is a TWS headset, a Bluetooth module is controlled to be paired to establish a communication connection with a mobile terminal. The control logic to be performed after detecting a wearing event is not limited in the embodiment.

A wearing detection method applied to a head-mounted device is provided according to the embodiment. The head-mounted device includes a GMR magnetic sensor and an IR sensor. The GMR magnetic sensor outputs a collected signal so that the MCU calculates a reference parameter indicating a position of the head-mounted device. The IR sensor outputs a collected signal so that the MCU makes determination based on the output signal. Only in a case that the reference parameter and the output signal meet the predetermined condition, it is determined that the head-mounted device is worn. It can be seen that with the technical solution, on one hand, the GMR magnetic sensor is added, which has high detection accuracy and is unsusceptible to external interferences. On the other hand, the GMR magnetic sensor and IR sensor are combined, which improves accuracy of detection, thereby improving user experiences.

Based on the above embodiments, as a preferred embodiment, the step of acquiring a signal collected by the GMR magnetic sensor to calculate a reference parameter indicating a position of the head-mounted device includes: acquiring three-axis data of the GMR magnetic sensor, and calculating acceleration as the reference parameter based on the three-axis data.

In the embodiment, the three-axis data of the GMR magnetic sensor are used in the calculation. The three-axis data can accurately reflect the position of the head-mounted device. However, considering the accuracy of the device and the actual use condition of the user, the three-axis data is used to calculate the acceleration as the reference parameter for comparison, instead of directly comparing the three-axis data, which can improve the accuracy of detection.

Further, step S11 includes steps S110 and S111.

In step S110, it is determined whether acceleration at a current acquisition time instant is different from acceleration at a previous acquisition time instant. Step S111 is performed in a case that the acceleration at the current acquisition time instant is not different from the acceleration at the previous acquisition time instant.

In step S111, it is determined whether the output signal is in a predetermined range. Step S12 is performed in a case that the output signal is in the predetermined range.

Figure 2:
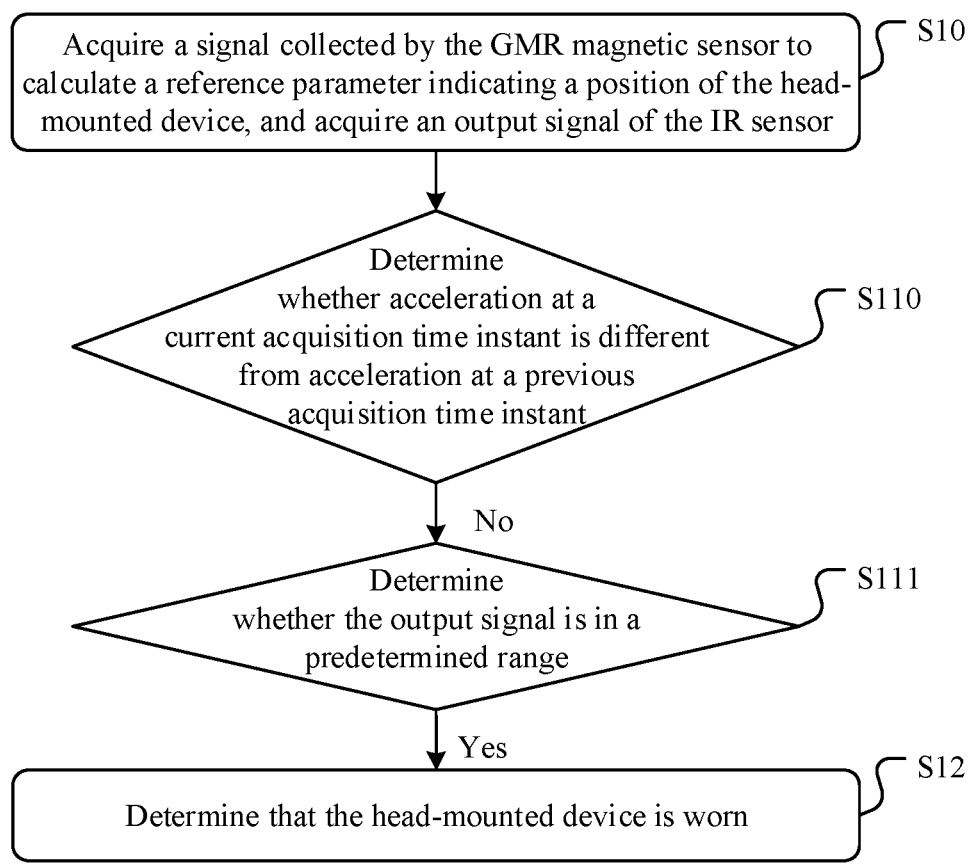
FIG. 2 is a flowchart of another wearing detection method applied to a head-mounted device according to an embodiment of the present disclosure.

FIG. 2 is a flowchart of another wearing detection method applied to a head-mounted device according to an embodiment of the present disclosure. As shown in FIG. 2, in the embodiment, whether the position of the GMR magnetic sensor is determined by determining whether the acceleration changes. In a case that the acceleration does not change, the position of the GMR magnetic sensor is determined to be fixed, and then it is determined whether the output signal of the IR sensor is in the predetermined range. It can be understood that the predetermined range may be determined through multiple experiments. In an embodiment, the predetermined range may be [0x0e, 0x0f].

It can be understood that if it is determined that the acceleration at the current acquisition time instant is different from the acceleration at the previous acquisition time instant in step S110, it indicates that the position of the GMR magnetic sensor is not fixed and thus it is unnecessary to determine the output signal of the IR sensor, so that the method returns to step S10. Similarly, if the result in step S111 is negative, it indicates that the output signal is not in the predetermined range, so that the method returns to step S10.

In the above embodiments, a time instant for turning on the IR sensor is not limited. However, in order to reduce power consumption, in an embodiment, the GMR magnetic sensor may be turned on first so that the GMR magnetic sensor acquires a signal. Then the MCU calculates the acceleration based on the signal. If the acceleration at the current acquisition time instant is not different from the acceleration at the previous acquisition time instant, the IR sensor is turned on and then the step of acquiring the output signal of the IR sensor is performed. If the acceleration at the current acquisition time instant is different from the acceleration at the previous acquisition time instant, the IR sensor is kept to be turned off.

Due to low power consumption of the GMR magnetic sensor, the overall power consumption of the head-mounted device is low even if the GMR magnetic sensor is turned on. On the other hand, by turning off the IR sensor, calculation amount of the MCU is reduced, saving resources.

Based on the above embodiments, the number of the IR sensor is not limited. However, considering that reliability of a single IR sensor is low and different users have different body conditions, in an embodiment, the head-mounted device is a wireless Bluetooth headset, and is provided with two IR sensors, which are respectively arranged on an earphone head and an earphone rod.

It can be understood that the wireless Bluetooth headset in the embodiment may be a single earphone or a TWS headset. Taking the TWS headset as an example, the TWS headset includes a master earphone and a slave earphone. The TWS headset include not only conventional devices of the TWS headset (such as an MCU, a communication module, a speaker, and a microphone), but also a GMR magnetic sensor and an IR sensor. It should be noted that the GMR magnetic sensor is usually arranged inside a housing to prevent displacement caused by an accidental touch. A small hole is provided on the housing for the IR sensor to emit and receive an infrared light through the hole. It can be understood that a position where the IR sensor is arranged may be determined according to the actual conditions of the TWS headset. The master earphone is connected with a mobile terminal to acquire an audio signal, and then the master earphone transmits the audio signal to the slave earphone, so that the master earphone and the slave earphone play audio. Therefore, the GMR magnetic sensor and the IR sensor are generally arranged on the master earphone. Alternatively, each of the master earphone and the slave earphone is provided with the GMR magnetic sensor and the IR sensor. If IR sensors are all arranged on the master earphone, the IR sensors may be arranged on the earphone head and the earphone rod respectively.

Figure 3:
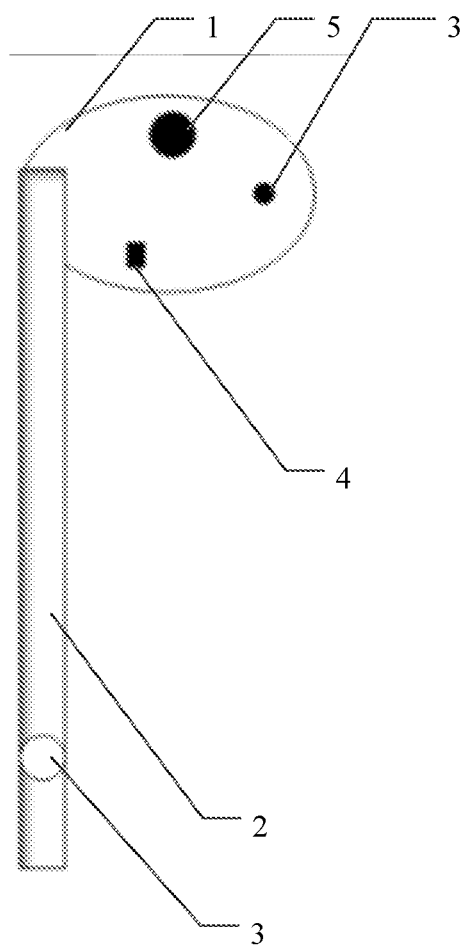
FIG. 3 is a structural schematic diagram of a master earphone of a TWS headset according to an embodiment of the present disclosure.

FIG. 3 is a structural schematic diagram of a master earphone of a TWS headset according to an embodiment of the present disclosure. As shown in FIG. 3, the master earphone includes an earphone head 1 and an earphone rod 2. The earphone head 1 is provided with an IR sensor 3 and the earphone rod 2 is provided with an IR sensor 3. The earphone head 1 is further provided with a GMR magnetic sensor 4, a speaker 5 and the like.

If two IR sensors are arranged, only in a case that an output signal of each of the two IR sensors is in the predetermined range, it is determined that the output signals are in the predetermined range. It should be noted that the IR sensor may also be arranged on the slave earphone.

Further, in order to deal with an error of an output signal of the IR sensor, as a preferred embodiment, whether the output signals are in the predetermined range is determined by: determining whether the output signal of each of the two IR sensors is in the predetermined range for consecutive n times, determining that the output signals are in the predetermined range if the output signal of each of the two IR sensors is in the predetermined range for consecutive n times, and otherwise determining that the output signals are not in the predetermined range.

It can be understood that in the previous embodiments, it is determined that the TWS headset is worn as long as it is determined that the output signal of the IR sensor is in the predetermined range for once, which cannot avoid misjudgment caused by the user accidentally covering the hole. In this embodiment, for the output signal of each of the two IR sensors, n consecutive determinations are performed. If the output signal of each of the two sensors is in the predetermined range for consecutive n times, it is finally determined that the output signals of the IR sensors are in the predetermined range, and thus it is determined that the TWS headset is worn. In the embodiments, a value of n may be determined according to actual conditions. In a preferred embodiment, n is equal to 5.

The embodiments of the wearing detection method applied to a head-mounted device are described in detail above. In order for better understanding of the implementation of the method in application scenarios, exemplary application scenarios are further described in the present disclosure, and the head-mounted device in the exemplary application scenarios is a TWS headset.

After the user takes out the TWS headset, the headset is powered on to initialize a system of the headset. The initialization includes: setting a sampling frequency of IR sensors (for example, 50 Hz), setting a predetermined range ([0x0e, 0x0f]) of the IR sensors, setting an acquisition interval (for example, 100 ms), and the like. If the user holds the TWS headset in hands, a position of a GMR magnetic sensor in the TWS headset is not fixed, so that acceleration corresponding to acquired three-axis data changes. In this case, the IR sensors are kept to be turned off. After the user wears the TWS headset, the position of the GMR magnetic sensor is fixed, so that the acceleration corresponding to acquired three-axis data does not change. In this case, an MCU controls the two IR sensors to be turned on and acquires signals according to the set sampling frequency of the IR sensors. The MCU determines that the output signal of each of the two IR sensors is in the IR predetermined range for consecutive five times, so that it is determined that the TWS headset is worn, so as to perform other operations according to predetermined control logic.

In the above embodiments, the wearing detection method applied to a head-mounted device is described in detail. Embodiments of a wearing detection apparatus applied to a head-mounted device are further provided according to the present disclosure. It should be noted that the embodiments of the apparatus are described in the present disclosure with respect to functional modules, and with respect to hardware.

Figure 4:
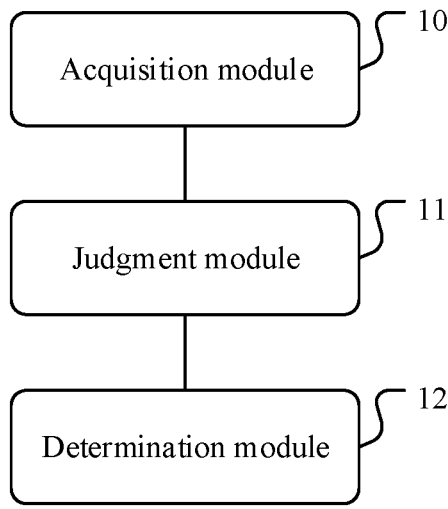
FIG. 4 is a structural diagram of an apparatus for detecting knock on a head-mounted device according to an embodiment of the present disclosure.

With respect to functional modules, a wearing detection apparatus applied to a head-mounted device corresponding to the method is provided according to the present disclosure. Similarly, head-mounted device is provided with a GMR magnetic sensor and an IR sensor. FIG. 4 is a structural diagram of an apparatus for detecting knock on a head-mounted device according to an embodiment of the present disclosure. As shown in FIG. 4, the apparatus includes: an acquisition module 10, a judgment module 11 and a determination module 12.

The acquisition module 10 is configured to acquire a signal collected by the GMR magnetic sensor to calculate a reference parameter indicating a position of the head-mounted device, and acquire an output signal of an IR sensor.

The judgment module 11 is configured to determine whether the reference parameter and the output signal meet a predetermined condition.

The determination module 12 is configured to determine that the head-mounted device is worn if the reference parameter and the output signal meet the predetermined condition.

The embodiments of the apparatus correspond to the embodiments of the method, so that for the embodiments of the apparatus, one may refer to the embodiments of the method and the embodiments of the apparatus are not described in detail.

A wearing detection apparatus applied to a head-mounted device is provided according to the embodiment. The head-mounted device includes a GMR magnetic sensor and an IR sensor. The GMR magnetic sensor outputs a collected signal so that the MCU calculates a reference parameter indicating a position of the head-mounted device. The IR sensor outputs a collected signal so that the MCU makes determination based on the output signal. Only in a case that the reference parameter and the output signal meet the predetermined condition, it is determined that the head-mounted device is worn. It can be seen that with the technical solution, on one hand, the GMR magnetic sensor is added, which has high detection accuracy and is unsusceptible to external interferences. On the other hand, the GMR magnetic sensor and IR sensor are combined, which improves accuracy of detection, thereby improving user experiences.

With respect to hardware, a wearing detection apparatus applied to a head-mounted device is provided according to the embodiment. The apparatus includes a memory 20 and a processor 21. The memory 20 stores a computer program. The processor 21 is configured to execute the computer program to perform the wearing detection method applied to a head-mounted device according to the above embodiments.

Figure 5:
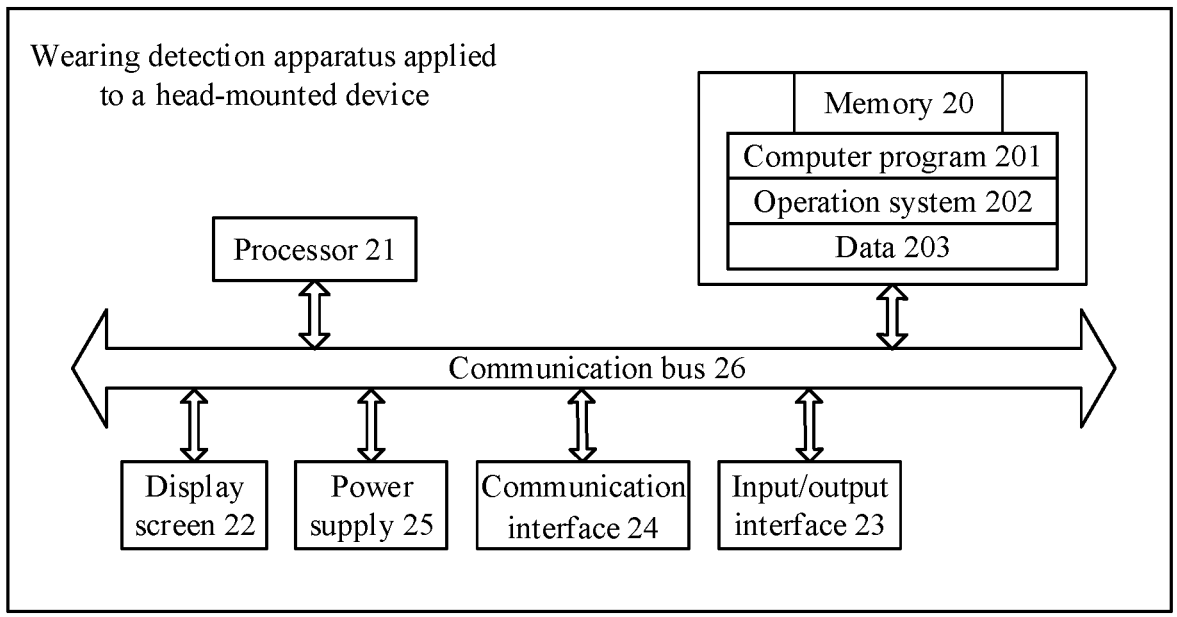
FIG. 5 is a structural diagram of a wearing detection apparatus applied to a head-mounted device according to another embodiment of the present disclosure.

FIG. 5 is a structural diagram of a wearing detection apparatus applied to a head-mounted device according to another embodiment of the present disclosure. The processor 21 may include one or more processing cores, such as 4-core processors, 8-core processors, and the like. The processor 21 may be implemented in at least one of hardware forms of DSP (Digital Signal Processing), FPGA (Field-Programmable Gate Array), and PLA (Programmable Logic Array). The processor 21 may further include a main processor and a coprocessor. The main processor is configured to process data in a wake-up state, and is also known as a CPU (Central Processing Unit). The coprocessor is a low-power processor configured to process data in a standby state. In some embodiments, the processor 21 may be integrated with a GPU (Graphics Processing Unit). The GPU is configured to render and draw content to be displayed on a display screen. In some embodiments, the processor 21 may further include an AI (Artificial Intelligence) processor configured to process a computational operation related to machine learning.

The memory 20 may include one or more computer readable storage media which may be non-transient. The memory 20 may further include a high-speed random access memory and a non-volatile memory, such as one or more disk storage devices and one or more flash memory devices. In the embodiment, the memory 20 is configured to store at least the following computer program 201. After being loaded and executed by the processor 21, the computer program can perform the wearing detection method applied to a head-mounted device disclosed in any of the above embodiments. In addition, resources stored in the memory 20 may further include an operating system 202 and data 203. The storage may be temporary storage or permanent storage. The operating system 202 may include Windows, Unix, Linux, and the like. The data 203 may include, but is not limited to, a signal collected by the GMR magnetic sensor, a signal output by the IR sensor, and the like.

In some embodiments, the wearing detection apparatus applied to a head-mounted device may further include a display screen 22, an input/output interface 23, a communication interface 24, a power supply 25, and a communication bus 26.

Those skilled in the art can understand that the wearing detection apparatus applied to a head-mounted device is not limited to the structure shown in FIG. 5, and the apparatus may include more or less components than those shown in the Figure.

A wearing detection apparatus applied to a head-mounted device is provided according to the embodiment. When the processor executes the computer program stored in the memory, the GMR magnetic sensor is controlled to output a collected signal so as to calculate a reference parameter indicating a position of the head-mounted device by the MCU, and the IR sensor is controlled to output a collected signal so as to make determination based on the output signal by the MCU. Only in a case that the reference parameter and the output signal meet the predetermined condition, it is determined that the head-mounted device is worn. It can be seen that, on one hand, the GMR magnetic sensor is added, which has high detection accuracy and is unsusceptible to external interferences. On the other hand, the GMR magnetic sensor and IR sensor are combined, which improves accuracy of detection, thereby improving user experiences.

In addition, a computer readable storage medium is further provided according to the present disclosure. The computer readable storage medium stores a computer program. The computer program, when being executed by a processor, performs the wearing detection method applied to a head-mounted device according to any one of the above embodiments.

It can be understood that if the method described in the above embodiments is implemented in a form of a software functional unit and sold or used as an independent product, the software functional unit may be stored in a computer readable storage medium. Based on the above understanding, the essential part of the technical solutions of the present disclosure or in other word, the part of the technical solutions that contributes to the conventional technology, or a part or all of the technical solutions may be implemented as a software product. The computer software product is stored in a storage medium to perform a part or all steps of the method according to the embodiments of the present disclosure. The storage medium includes various medium capable of storing a program code, such as a USB flash disk, a removable hard disk, a Read-Only Memory (ROM), a Random Access Memory (RAM), a disk, and a compact disc.

The computer readable storage medium according to the embodiment stores a computer program. When the computer program is executed, the GMR magnetic sensor outputs a collected signal so as to calculate a reference parameter indicating a position of the head-mounted device by the MCU, and the IR sensor outputs a collected signal so as to make determination based on the output signal by the MCU. Only in a case that the reference parameter and the output signal meet the predetermined condition, it is determined that the head-mounted device is worn. It can be seen that, with the technical solutions, on one hand, the GMR magnetic sensor is added, which has high detection accuracy and is unsusceptible to external interferences. On the other hand, the GMR magnetic sensor and IR sensor are combined, which improves accuracy of detection, thereby improving user experiences.

A head-mounted device is further provided according to the present disclosure, and the head-mounted device is a wireless Bluetooth headset. The wireless Bluetooth headset includes a headset body, a GMR magnetic sensor and an IR sensor. The GMR magnetic sensor and the IR sensor are connected with an MCU in the headset body. The MCU is configured to acquire a signal collected by the GMR magnetic sensor to calculate a reference parameter indicating a position of the wireless Bluetooth headset. The MCU is further configured to acquire an output signal of the IR sensor, determine whether the reference parameter and the output signal meet a predetermined condition, and determine that the wireless Bluetooth headset is worn if the reference parameter and the output signal meet the predetermined condition.

Figure 6:
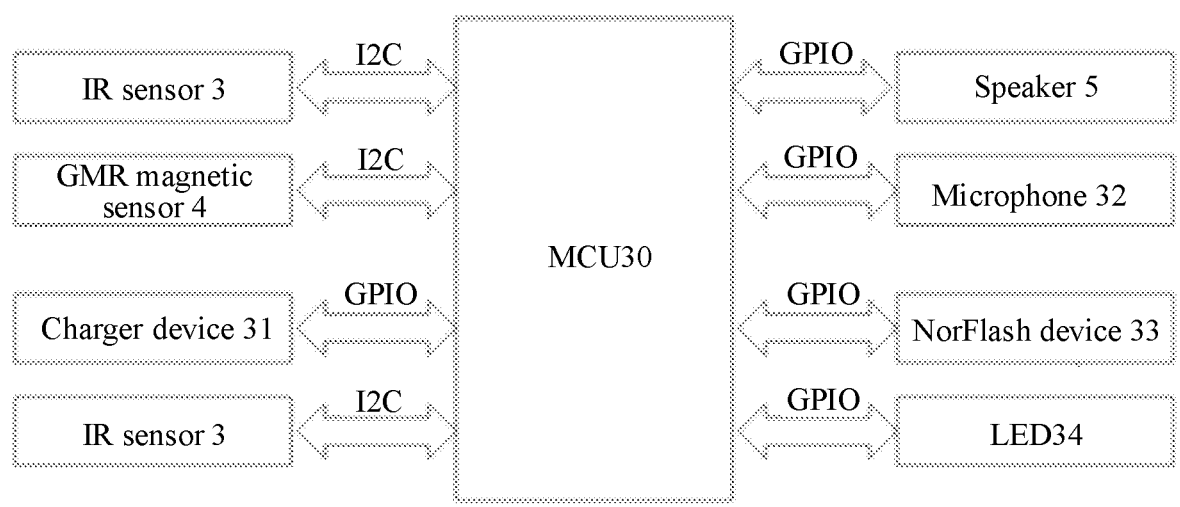
FIG. 6 is a structural diagram of a TWS headset according to an embodiment of the present disclosure.

In order to clearly explain the structure of the wireless Bluetooth headset, the TWS headset is taken as an example in the embodiment. FIG. 6 is a structural diagram of a TWS headset according to an embodiment of the present application. It can be understood that the headset body may include an MCU 30, a Charger device 31, a microphone 32, a NorFlash device 33, an LED 34, a speaker 5 and the like. The MCU 30 communicates with the GMR magnetic sensor 4 and the IR sensor 3 based on the I2C communication protocol to perform wearing detection. The MCU 30 controls, through the GPIO, the Charger device 31 to acquire and report power information and the LED 34 to lighten a breathing lamp under different states of the headset. The MCU 30 controls, based on the SPI communication protocol, the NorFlash device 33 to store information, enhancing the storage function of the TWS headset. MCU 30 controls, through the GPIO, the microphone 32 and the speaker 5 to acquire and play audio.

The head-mounted device according to the embodiment is a wireless Bluetooth headset. The headset includes a GMR magnetic sensor and an IR sensor. The GMR magnetic sensor outputs a collected signal so that the MCU calculates a reference parameter indicating a position of the head-mounted device. The IR sensor outputs a collected signal so that the MCU makes determination based on the output signal. Only in a case that the reference parameter and the output signal meet the predetermined condition, it is determined that the wireless Bluetooth headset is worn. It can be seen that with the technical solutions, on one hand, the GMR magnetic sensor is added, which has high detection accuracy and is unsusceptible to external interferences. On the other hand, the GMR magnetic sensor and IR sensor are combined, which improves accuracy of detection, thereby improving user experiences.

The head-mounted device, the wearing detection method, the wearing detection apparatus, and the medium according to the present disclosure are described in detail above. The embodiments in the specification are described in a progressive way, each of which emphasizes the differences from others, and for the same or similar parts among the embodiments, one may refer to description of other embodiments. Since the device disclosed in the embodiments is basically similar to the method therein, the description of the device is relatively simple, and for relevant matters, one may refer to the description of the method embodiments. It should be noted that those skilled in the art can make various improvements and modifications to the present disclosure without departing from the principles of the present disclosure, and the improvements and modifications fall within the protection scope of the claims of the present disclosure.

It should be noted that in the present disclosure, relationship terms such as "first" and "second" are merely for distinguishing one entity or operation from another entity or operation rather than indicating or implying an actual relationship or order between these entities or operations. In addition, in this specification, terms of "include", "comprise" or any other variants are intended to be non-exclusive. Therefore, a process, a method, an article or a device including multiple elements includes not only the elements but also other elements that are not enumerated, or also include elements inherent to the process, the method, the article or the device. Unless expressively limited otherwise, the statement "comprising (including) a . . . " does not exclude a case that other similar elements may exist in the process, the method, the article or the device.

The invention claimed is:

1. A wearing detection method applied to a head-mounted device, wherein:
   the head-mounted device comprises a giant magnetoresistance (GMR) magnetic sensor and an infrared (IR) sensor;
   the method comprises:
   acquiring a signal collected by the GMR magnetic sensor to calculate a reference parameter indicating a position of the head-mounted device, wherein acquiring the signal comprises:
   acquiring three-axis data of the GMR magnetic sensor; and
   calculating acceleration as the reference parameter based on the three-axis data,
   acquiring an output signal of the IR sensor;
   determining whether the reference parameter and the output signal meet a predetermined condition, wherein the determining whether the reference parameter and the output signal meet the predetermined condition comprises:
   determining whether acceleration at a current acquisition time instant is different from acceleration at a previous acquisition time instant;
   determining whether the output signal is in a predetermined range if the acceleration at the current acquisition time instant is not different from the acceleration at the previous acquisition time instant; and
   determining that the reference parameter and the output signal meet the predetermined condition if the output signal is in the predetermined range, wherein the output signal of the IR sensor is acquired after the IR sensor is turned on in the case that the acceleration at the current time instant is not different from the acceleration at the previous acquisition time instant; and determining that the head-mounted device is worn if the reference parameter and the output signal meet the predetermined condition.

2. The method according to claim 1, wherein the head-mounted device is a wireless Bluetooth headset, and the IR sensor comprises two IR sensors respectively arranged on an earphone head and an earphone rod of the wireless Bluetooth headset.

3. The method according to claim 2, wherein the wireless Bluetooth headset is a true wireless stereo (TWS) headset, and the two IR sensors are respectively arranged on an earphone head of a master earphone of the TWS headset and an earphone rode of the master earphone.

4. The method according to claim 3, wherein the determining whether the output signal is in the predetermined range comprises:

determining whether a condition that the output signal of each of the two IR sensors is in the predetermined range for consecutive n times is met;

determining that the output signal is in the predetermined range if the condition is met; and determining that the output signal is not in the predetermined range if the condition is not met, wherein n is a positive integrate greater than 1.

5. A wearing detection apparatus applied to a head-mounted device, wherein:

the head-mounted device comprises a giant magnetoresistance (GMR) magnetic sensor and an infrared (IR) sensor;

the apparatus comprises:

an acquisition module configured to acquire a signal collected by the GMR magnetic sensor to calculate a reference parameter indicating a position of the head-mounted device, and acquire an output signal of an IR sensor, wherein acquisition module is configured to:

acquire three-axis data of the GMR magnetic sensor; and calculate acceleration as the reference parameter based on the three-axis data;

a judgment module configured to determine whether the reference parameter and the output signal meet a predetermined condition, wherein the judgment module is configured to:

determine whether acceleration at a current acquisition time instant is different from acceleration at a previous acquisition time instant;

determine whether the output signal is in a predetermined range if the acceleration at the current acquisition time instant is not different from the acceleration at the previous acquisition time instant; and determine that the reference parameter and the output signal meet the predetermined condition if the output signal is in the predetermined range, wherein the output signal of the IR sensor is acquired after the IR sensor is turned on in the case that the acceleration at the current time instant is not different from the acceleration at the previous acquisition time instant; and a determination module configured to determine that the head-mounted device is worn if the reference parameter and the output signal meet the predetermined condition.

6. A wearing detection apparatus applied to the head-mounted device, comprising:

a memory storing a computer program; and a processor configured to execute the computer program to perform the warding detection method applied to the head-mounted device according to claim 1.

7. A non-transitory computer readable storage medium, wherein the non-transitory computer readable storage medium stores a computer program that, when being executed by a processor, performs the wearing detection method applied to the head-mounted device according to claim 1.

8. A head-mounted device, wherein the head-mounted device is a wireless Bluetooth headset comprising a headset body, a giant magnetoresistance (GMR) magnetic sensor and an infrared (IR) sensor, wherein:

the GMR magnetic sensor and the IR sensor are connected to an MCU in the headset body, wherein the MCU is configured to:

acquire a signal collected by the GMR magnetic sensor to calculate a reference parameter indicating a position of the wireless Bluetooth headset, wherein acquiring the signal comprises:

acquiring three-axis data of the GMR magnetic sensor; and calculating acceleration as the reference parameter based on the three-axis data;

acquire an output signal of the IR sensor;

determine whether the reference parameter and the output signal meet a predetermined condition, wherein the determining whether the reference parameter and the output signal meet the predetermined condition comprises:

determining whether acceleration at a current acquisition time instant is different from acceleration at a previous acquisition time instant;

determining whether the output signal is in a predetermined range if the acceleration at the current acquisition time instant is not different from the acceleration at the previous acquisition time instant; and determining that the reference parameter and the output signal meet the predetermined condition if the output signal is in the predetermined range, wherein the output signal of the IR sensor is acquired after the IR sensor is turned on in the case that the acceleration at the current time instant is not different from the acceleration at the previous acquisition time instant; and determine that the wireless Bluetooth headset is worn if the reference parameter and the output signal meet the predetermined condition.

* * * * *